United States Patent [19]

Bai

[11] Patent Number: 6,090,315
[45] Date of Patent: Jul. 18, 2000

[54] FIRE RETARDING ADDITIVE

[75] Inventor: Jun Sheng Bai, San Diego, Calif.

[73] Assignee: Q.D.S. Injection Molding, Inc., San Diego, Calif.

[21] Appl. No.: 09/093,908

[22] Filed: Jun. 8, 1998

[51] Int. Cl.$^7$ ............................ C09K 21/02; C09D 5/18
[52] U.S. Cl. ...................... 252/601; 252/604; 252/609; 252/610; 252/611; 106/18.12; 106/18.13
[58] Field of Search .................. 252/601, 602, 252/606, 609, 610, 611; 106/18.12, 18.13

[56] References Cited

U.S. PATENT DOCUMENTS

| | | | |
|---|---|---|---|
| 3,458,327 | 7/1969 | Fraser | 106/14 |
| 3,804,639 | 4/1974 | Trulsson et al. | 106/14 |
| 3,928,059 | 12/1975 | Ferrigno | 106/306 |
| 4,851,044 | 7/1989 | Stawinski | 106/18.12 |
| 5,037,878 | 8/1991 | Cerles et al. | 524/588 |
| 5,053,077 | 10/1991 | Crompton | 106/18.16 |
| 5,066,712 | 11/1991 | Lewis | 524/563 |
| 5,306,759 | 4/1994 | Sakagami et al. | 524/379 |
| 5,576,384 | 11/1996 | Nölken et al. | 524/806 |

*Primary Examiner*—Joseph D. Anthony
*Attorney, Agent, or Firm*—Leonard Tachner

[57] ABSTRACT

A powdered mixture of various minerals combine to form a fire retardant additive suitable for addition to paints for coating walls and the like. The minerals in a preferred embodiment comprise quartz, mullite, magnesite, zircon and baddeleyite, talc, andalusite kyanite, vermiculite and tincal. The additive expands when subjected to high temperature and forms a protective heat shield.

10 Claims, No Drawings

FIRE RETARDING ADDITIVE

BACKGROUND OF THE INVENTION

1. Field of the Invention

The present invention relates generally to the field of fire retarding additives, and more specifically to a $SiO_2$ based, powder mixture which may be added to paint to provide a fire retarding effect.

2. Prior Art

The prior art is rife with fire retardant compositions. The preferred fire retardant would be formulated from a basic abundant mineral, would be biologically and environmentally benign, would react to high temperature by expanding to form a protective layer and would be immune to burning at even extremely high temperatures. Moreover, the preferred fire retardant would be a suitable additive to coatings such as paints to provide walls, roofs and the like with fire protection.

A search of the prior art has revealed the following U.S. Patents which are relevant to the present invention:
U.S. Pat. No. 3,892,577 Sugahara et al
U.S. Pat. No. 3,983,040 Draganov
U.S. Pat. No. 4,226,838 Boros et al
U.S. Pat. No. 4,347,331 Self
U.S. Pat. No. 4,514,326 Sallay
U.S. Pat. No. 4,838,941 Hill
U.S. Pat. No. 4,843,103 Albertelli et al
U.S. Pat. No. 4,900,698 Lundsager
U.S. Pat. No. 4,992,321 Kandachi et al
U.S. Pat. No. 5,153,657 Yu et al Of the foregoing, the following appear to be most pertinent:

U.S. Pat. No. 4,843,103 to Albertelli et al is directed to foamed plastic materials. The foamed resinous product having excellent fire resistance uses at least 20% by weight of a finely divided inert and insoluble particulate solid, products capable of being employed as wood-substitutes or obtained when a dihydric compound is included in the mixture and the solid is talc, flyash and/or hydraulic cement. Any finely divided particulate solid which is insoluble in the reaction mixture appears to be suitable, provided it is inert and does not act as a blowing agent. Examples are clays, clay minerals, talc, vermiculite metal oxides, refractories and mineral fibers. Magnesite is also included.

U.S. Pat. No. 4,992,321 to Kandachi et al is directed to heat resistant foamed glass. Preferred examples of foliaceous or flaky filler materials are shale flakes, slate flakes and chlorite flakes. Mica vermiculite and kaolin may also be used. Preferred examples of fibrous filler materials are wollastonite and asbestos represented by chrysotile. A preferred example of non-metallic powdery or granular filler materials is pyrophyllite. It is also possible to use alumina, in particular corundum or a mineral of high alumina silicate type such as feldspar, zircon, cordierite, mullite or sillimanite. Talc may also be included.

U.S. Pat. No. 4,514,326 to Sallay is directed to a permanent flame retardant and anti-smoldering composition. The following are given as examples of tetraborates which may be employed in the practice of the present invention: tincal or borax, kernite or rasorite, tincalconite or borax pentahydrate, ulexite or boronatrocalcite and the industrially produced anhydrous borax.

U.S. Pat. No. 3,892,577 to Sugahara et al is directed to a white pigment excelling in resistance to flame and corrosion. In one embodiment of the invention, a white pigment is provided consisting of zirconium phosphate of the formula $ZrO.(0.4–1.0) P_2O_3$, such zirconium phosphate containing at least 0.1% of a water soluble component. Zirconium phosphate, which is used in the invention as a flame resistant and corrosion resistant white pigment, can be prepared in the following manner: the starting zirconium material used as either an acid solution thereof obtained by melting a concentrate of zirconium minerals such as zircon sand and baddeleyite with an alkali, as required, to vitrify the zirconium material and thereafter dissolving same in a mineral acid such as sulfuric, hydrochloric, or nitric; zirconium chloride obtained in an intermediate stage of the so-called Kroll method may also be used.

U.S. Pat. No. 4,347,331 to Self is directed to a foamed, low density, highly extended unsaturated polyester resin syrup composition, a shaped article comprised of the composition and a process for preparing such article. The shaped article contains magnesite, mullite and vermiculite.

U.S. Pat. No. 4,838,941 to Hill describes a magnesium cement comprising talc, vermiculite and magnesite. U.S. Pat. No. 4,900,698 to Lundsager describes a ceramic product and process containing talc, vermiculite and mullite. U.S. Pat. No. 5,153,657 to Yu et al discloses a cleaning blade wear life extension by inorganic fillers reinforcement which contains quartz, diaspore, anatase, rutile and ilmenite. U.S. Pat. No. 4,226,838 to Boros et al discloses a process for accelerating the digestion and sedimentation steps of the Bayer alumina process which also comprises quartz, diaspore, anatase, rutile and ilmenite.

None of the aforementioned prior art has all of the features of the preferred fire retardant of the present invention.

SUMMARY OF THE INVENTION

The present invention comprises a powder composition, the principal ingredients of which are quartz, mullite, magnesite, zircon, talc, vermiculite and tincal. These ingredients are provided as a substantially homogeneous powdered mixture in a 200–400 mesh size. In a preferred embodiment, the weight percentages of the principal ingredients are quartz 22%, mullite 16%, magnesite 18%, zircon 4%, talc 20%, vermiculite 4% and tincal 3%. The remaining 13% of the powder is formed from a variety of additional minerals the details of which are disclosed hereinbelow.

The ingredients of the inventive mixture are selected primarily for their fire retarding, high temperature characteristics or for their expansion behavior at high temperature. The ingredients are also selected to provide a composition which will not generate toxins at high temperature. Most significantly, the mixture of the present invention is readily integrated into other materials such as paints, plastics and rubber compounds. When added to paint in sufficient quantity, i.e., 20% by weight of total powder/paint combination, the invention is readily applied as an integral, homogeneous component of the paint and provides an excellent fire retardant coating. The fire retardant of the invention is a safe heat shield which reacts only physically and not chemically to high temperature. It meets all of the feature requirements of a preferred fire retardant material.

OBJECTS OF THE INVENTION

It is therefore a principal object of the present invention to provide an improved fire retardant in the form of a powdered mixture of various minerals, the mixture being especially suitable to mix into liquid coatings such as paints and resins.

It is another object of the invention to provide a fire retardant in the form of a unique combination of minerals which, when subjected to high temperature, expands and forms a protective layer over an underlying substrate such as a wall or roof.

It is still another object of the invention to provide a fire retardant material which will not produce toxic gases at high temperatures, but will produce an expanded, insulating layer which protects an underlying substrate material up to temperatures of 1,500 degrees Celsius.

It is still another object of the invention to provide a fire retarding additive which can be mixed into paints, plastics, rubber compounds and other materials for being applied to surfaces to be protected against fire with a protective layer of expanded insulative retardant resulting from the reaction of the additive to high temperature.

DETAILED DESCRIPTION OF A PREFERRED EMBODIMENT

The invention comprises a mixture of selected minerals which form a unique and highly advantageous fire retardant additive material. The term "additive" in the context of this invention, refers to the preferred use of the invention as a powder to be added to a liquid coating material such as paint. When added to paint in about a weight ratio of 1 to 5, the additive renders the paint highly resistant to fire. Moreover, the resulting fire resistant paint does not exhibit any increased toxic effects under high temperature.

TABLE 1 below, provides a list of the powdered mixture which constitutes the preferred embodiment of the invention. The constituents which provide the bulk of the mixture include quartz (22%), mullite (16%), magnesite (18%) and talc (20%). The quartz, mullite and magnesite are fire retardant fillers. The magnesite also improves bonding of the mixture. The talc provides for a more homogenous mixture. Other important constituents include zircon and baddeleyite (4%), vermiculite (4%) and tincal (3%). These ingredients increase temperature resistance, provide an expansion characteristic at high temperature and increase bonding of the ingredients.

TABLE 2 below, provides a list of the powdered mixture which constitutes an alternative embodiment of the invention. In this embodiment, the amount of quartz is 12% of the mixture by weight and sodium silicate comprises 10% of the mixture by weight. The sodium silicate may be provided in liquid form to receive the remainder of the mixture for application as a fire retardant coating.

TABLE 1

| MINERAL | COMPOSITION | PERCENT BY WEIGHT | FUNCTION IN MIXTURE |
| --- | --- | --- | --- |
| Quartz | $SiO_2$ | 22 | Fire Retardant & Filler |
| Mullite | $3Al_2O_3.2SiO_2$ | 16 | Fire Retardant |
| Diaspore | $Al_2O.H_2O$ | 5 | Fire Retardant |
| Anatase | $TiO_2$ | 0.5 | Fire Retardant |
| Rutile | $TiO_2$ | 0.5 | Fire Retardant |
| Magnesite | $MgCO_3$ | 18 | Fire Retardant, Bonding |
| Zircon and Baddeleyite | $ZrSiO_4 + ZrO_2$ | 4 | Increase Temperature Capability |
| Talc | $3MgO.4SiO_2.H_2O$ | 20 | Increase Homogeneity of Mixture |
| Andalusite Kyanite | $Al_2OSiO_4 + Al_2O_3.SiO_2$ | 3 | Increase Temperature Capability |
| Ilmenite | $FeO.TiO_2$ | 1 | Increase Temperature Capability |
| Zinc Oxide | $ZnO$ | 2 | Fire Retardant, Bonding |
| Vermiculite | Hydrated Mo, Fe, Al Silicate | 4 | Expansion at High Temperature |
| Chlorite | $(Mg, Fe^{2+}, Fe^{3+})_6 AlSi_3O_{10}(OH)_8$ | 0.3 | Bonding |
| Humite | $Mg_5(SiO_4)_2(F, OH)_2$ | 0.1 | Bonding |
| Feldspar | $KAl\ Si_3O_8$ | 0.1 | Crystallization at High Temperature |
| Tincal | $Na_2B_4O_7.10H_2O$ | 3 | Bonding |
| Other | | 0.5 | |

TABLE 2

| MINERAL | COMPOSITION | PERCENT BY WEIGHT | FUNCTION IN MIXTURE |
| --- | --- | --- | --- |
| Quartz | $SiO_2$ | 12 | Fire Retardant & Filler |
| Sodium Silicate | $Na_2 SiO_3$ | 10 | Fire Retardant & Binding |
| Mullite | $3Al_2O_3.2SiO_2$ | 16 | Fire Retardant |
| Diaspore | $Al_2O.H_2O$ | 5 | Fire Retardant |
| Anatase | $TiO_2$ | 0.5 | Fire Retardant |
| Rutile | $TiO_2$ | 0.5 | Fire Retardant |
| Magnesite | $MgCO_3$ | 18 | Fire Retardant, Bonding |
| Zircon and Baddeleyite | $ZrSiO_4 + ZrO_2$ | 4 | Increase Temperature Capability |
| Talc | $3MgO.4SiO_2.H_2O$ | 20 | Increase Homogeneity of Mixture |

TABLE 2-continued

| MINERAL | COMPOSITION | PERCENT BY WEIGHT | FUNCTION IN MIXTURE |
| --- | --- | --- | --- |
| Andalusite Kyanite | $Al_2OSiO_4 + Al_2O_3.SiO_2$ | 3 | Increase Temperature Capability |
| Ilmenite | $FeO.TiO_2$ | 1 | Increase Temperature Capability |
| Zinc Oxide | $ZnO$ | 2 | Fire Retardant, Bonding |
| Vermiculite | Hydrated Mo, Fe, Al Silicate | 4 | Expansion at High Temperature |
| Chlorite | $(Mg, Fe^{2+}, Fe^{3+})_6 AlSi_3O_{10}(OH)_8$ | 0.3 | Bonding |
| Humite | $Mg_5(SiO_4)_2(F, OH)_2$ | 0.1 | Bonding |
| Feldspar | $KAl\ Si_3O_8$ | 0.1 | Crystallization at High Temperature |
| Tincal | $Na_2B_4O_7.10H_2O$ | 3 | Bonding |
| Other | | 0.5 | |

In the preferred embodiment there are other constituents of the mixture; other minerals designed to either increase fire and high temperature resistance, increase expansion in reaction to heat, increase bonding or increase homogeneity of the mixture. These constituents include diaspore (5%), anatase (0.5%), rutile (0.5%), andalusite kyanite (3%), ilmenite (1%), zinc oxide (2%), chlorite (0.3%), humite (0.1%), feldspar (0.1%) and up to 0.5% of other minerals. The entire mixture is formed as a fine powder (200 to 400 mesh).

Not all of the ingredients of the preferred embodiment of Table 1 are required to provide a suitable fire retardant additive. Those ingredients which are considered relatively essential are mullite, magnesite, zircon and baddeleyite, talc, vermiculite and tincal. The remaining ingredients of the preferred embodiment may be either omitted or replaced by other constituents of generally similar function. By way of example, the quartz, which functions as a fire retardant and filler, may be replaced with another fire resistant bulk material such as alumina.

By utilizing the essential ingredients of the invention as a powdered additive, the result is a biologically and environmentally safe retardant which can be mixed into water-based paint, oil-based paint and resin-based paint. The additive delays the penetration of walls coated with such paints thereby allowing safe exit from a burning building. When exposed to fire, the additive expands and creates an insulating layer. Because there are no harmful materials, the additive will not release any toxic gases and it will not burn or burst. Moreover, when subjected to heat, the additive crystallizes, increases in size up to 25 fold.

Having thus described a preferred embodiment of the invention, it being understood that variations and additions are contemplated to be within the scope hereof, what is claimed is:

1. A fire retardant mixture for mixing with liquid coatings comprising:
an inorganic mixture by weight of approximately 16% mullite, approximately 18% magnesite, approximately 4% zircon and baddeleyite admixture, approximately 20% talc, approximately 4% vermiculite, approximately 3% tincal and further comprising approximately 12%–22% alumina and/or quartz, said mixture being in the form of a powder having particle size in the range of about 200 to 400 mesh.

2. The fire retardant mixture as recited in claim 1 further including by weight approximately 5% diaspore.

3. The fire retardant mixture as recited in claim 1 further including by weight approximately 3% of the combination of andalusite and kyanite.

4. The fire retardant mixture as recited in claim 1 further including by weight approximately 2% zinc oxide.

5. The fire retardant mixture as recited in claim 1 further including by weight approximately 10% sodium silicate.

6. The fire retardant mixture as recited in claim 1 further including by weight approximately 0.5% anatase.

7. The fire retardant mixture as recited in claim 1 further including by weight approximately 0.5% rutile.

8. The fire retardant mixture as recited in claim 1 further including by weight approximately 1.0% limenite.

9. The fire retardant mixture as recited in claim 1 further including by weight approximately 0.1% humite.

10. The fire retardant mixture as recited in claim 1 further including by weight approximately 0.1% feldspar.

* * * * *